US012575476B2

(12) United States Patent
Rains et al.

(10) Patent No.: US 12,575,476 B2
(45) Date of Patent: Mar. 17, 2026

(54) AUTOMATIC VOLUME-BASED FRAME WEIGHT DISTRIBUTION SYSTEM AND METHOD

(71) Applicant: DEERE & COMPANY, Moline, IL (US)

(72) Inventors: Gerald E. Rains, Eldridge, IA (US); Bin Shi, Johnston, IA (US); Kevin P. Cowles, Ankeny, IA (US); Jason D. Walter, Bettendorf, IA (US); Shawn A. Kenny, Ames, IA (US); Olaf J. Peterson, Waukee, IA (US)

(73) Assignee: Deere & Company, Moline, IL (US)

( * ) Notice: Subject to any disclaimer, the term of this patent is extended or adjusted under 35 U.S.C. 154(b) by 912 days.

(21) Appl. No.: 17/731,643

(22) Filed: Apr. 28, 2022

(65) Prior Publication Data

US 2023/0345859 A1    Nov. 2, 2023

(51) Int. Cl.
*A01B 79/02* (2006.01)
*A01B 63/00* (2006.01)
(Continued)

(52) U.S. Cl.
CPC ............ *A01B 79/02* (2013.01); *A01B 63/002* (2013.01); *A01C 7/06* (2013.01); *G01F 22/00* (2013.01)

(58) Field of Classification Search
None
See application file for complete search history.

(56) References Cited

U.S. PATENT DOCUMENTS 8,695,396 B2 * 4/2014 Landphair .............. A01C 7/081
                                                   73/1.16
10,582,653 B2 * 3/2020 Bassett .................. A01C 5/064
                        (Continued)

FOREIGN PATENT DOCUMENTS

EP       2508057 A1 * 10/2012 ........... A01B 69/007
EP       2708859 A1 * 3/2014 ........... A01C 15/006
                        (Continued)

OTHER PUBLICATIONS

Magdoff, F. and Van Es, H. (2021) Building Soils for Better Crops. Sustainable Soil Management, IV Ed, Sustainable Agriculture Research and Education (SARE) Program, National Institute of Food and Agriculture, (USDA). (Year: 2021).*
                        (Continued)

*Primary Examiner* — Hitesh Patel
*Assistant Examiner* — Tabitha Kress
(74) *Attorney, Agent, or Firm* — Taft Stettinius & Hollister LLP; Stephen F. Rost

(57) ABSTRACT

An agricultural machine may include a first plurality of sensors configured to measure characteristics of product stored on the machine for use during the machine's operation. The machine may also include a second plurality of sensors configured to measure characteristics associated with operation of the machine, in particular, in the form of feedback from ground engaging mechanisms of the machine, such as row units and wheel assemblies coupled to a frame of the machine. Based on the measured characteristics of the stored product and the measured characteristics associated with the machine's operation, a controller may adjust actuators coupled between adjacent sections of the frame to transfer weight of the stored product between certain sections of the frame, which in turn optimizes the machine's operational characteristics.

20 Claims, 8 Drawing Sheets

(51) Int. Cl.
  A01C 7/06      (2006.01)
  G01F 22/00     (2006.01)

(56)           References Cited

U.S. PATENT DOCUMENTS

| | | |
|---|---|---|
| 11,284,554 B2 | 3/2022 | Maro |
| 2015/0013579 A1 | 1/2015 | Mariman et al. |
| 2015/0127212 A1* | 5/2015 | Chacon .................. G01S 19/14 |
| | | 701/32.4 |
| 2015/0230403 A1* | 8/2015 | Jung .................... A01D 41/145 |
| | | 701/50 |
| 2016/0120107 A1 | 5/2016 | Chahley et al. |
| 2016/0161306 A1* | 6/2016 | Gervais ..................... G06T 7/62 |
| | | 73/861.73 |
| 2017/0086352 A1* | 3/2017 | Frasier ................... B65G 53/60 |
| 2022/0142037 A1* | 5/2022 | Wintemute ......... A01M 9/0092 |
| 2022/0301142 A1* | 9/2022 | Henry ................. A01B 69/001 |

| | | | |
|---|---|---|---|
| 2023/0200291 A1* | 6/2023 | Thompson ............... A01C 7/06 |
| | | | 111/174 |

FOREIGN PATENT DOCUMENTS

| | | | |
|---|---|---|---|
| EP | 2823700 A1 * | 1/2015 | ............. A01B 63/24 |
| EP | 3815503 A1 | 5/2021 | |
| EP | 3932168 A1 | 1/2022 | |

OTHER PUBLICATIONS

Bland, J. Martin and Altman, Douglas G. (2007) Agreement between methods of measurement with multiple observations per individual. Journal of Biopharmaceutical Statistics, 17 (4). 571-582. (Year: 2007).*

Extended European Search Report and Written Opinion issued in European Patent Application No. 23163909.7, dated Sep. 18, 2023, in 10 pages.

* cited by examiner

500

Determine Product
Weight                    ⌐502

Redistribute 25% of
Product Weight to        ⌐504
Each Wing Section

Repeat Determining
and Redistributing       ⌐506
Steps

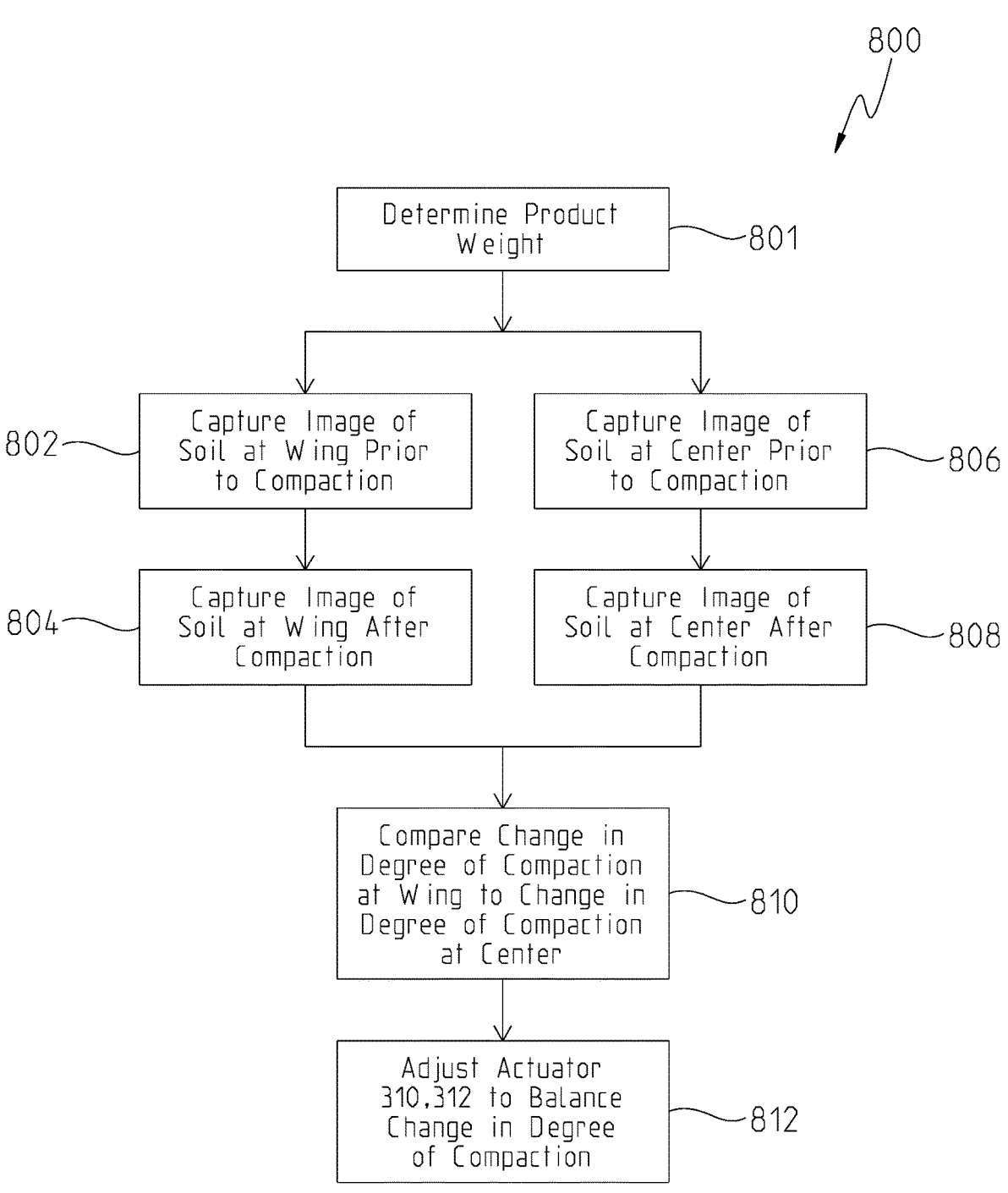

800

Determine Product
Weight
~801

Capture Image of
Soil at Wing Prior
to Compaction
802~

Capture Image of
Soil at Center Prior
to Compaction
~806

Capture Image of
Soil at Wing After
Compaction
804~

Capture Image of
Soil at Center After
Compaction
~808

Compare Change in
Degree of Compaction
at Wing to Change in
Degree of Compaction
at Center
~810

Adjust Actuator
310,312 to Balance
Change in Degree
of Compaction
~812

Fig. 8

AUTOMATIC VOLUME-BASED FRAME WEIGHT DISTRIBUTION SYSTEM AND METHOD

FIELD OF THE DISCLOSURE

The present disclosure relates to a weight distribution for an agricultural machine, and more particularly to an automatic weight distribution system and method based on volume of product store on the agricultural machine.

BACKGROUND

Many conventional agricultural machines, in particular agricultural machines such as planters, include a frame. Some such agricultural machines include a center portion of the frame and various other portions of the frame arranged laterally outward from the center portion. Some agricultural machines that include a frame may have a weight distribution system related to the frame. Weight distribution systems of conventional agricultural machines are manually adjustable by an operator or other user. Drawbacks have been identified such as lack of convenience and difficulty of use due to physical constraints. These drawbacks are often due to the requirement for manual adjustment of weight distribution across the frame. Therefore, what is needed is a system and method for automatically distributing or redistributing weight across a frame of an agricultural machine.

SUMMARY

In an illustrative embodiment, a system for automatically redistributing weight across a frame of an agricultural machine during operation thereof comprises the frame, which includes: a center section, a first wing section coupled to the center section, and a second wing section coupled to the center section and positioned opposite the first wing section; a product storage system supported by the center section and including one or more tanks configured to store product usable in an operation of the agricultural machine; a first actuator coupled to the center section and to the first wing section; a second actuator coupled to the center section and to the second wing section; and at least one sensor configured to measure or detect a characteristic associated with the product stored in the product storage system; a controller operatively coupled to the first actuator, the second actuator, and the at least one sensor; wherein the controller is configured to determine the volume of product in the product storage system based on at least one measured or detected characteristic associated with the product and received from the at least one sensor; and wherein the controller is configured to adjust at least one of the first actuator and the second actuator to redistribute weight across the frame based on the determined volume of product in the product storage system.

In some embodiments, the at least one sensor is configured to measure the shape of a collection of product in the product storage system; wherein the at least one sensor is one of a LIDAR sensor, ultrasonic sensor, or stereo camera sensor; and wherein the controller determines the volume of product in the product storage system based on the measured shape of the collection of product in the product storage system.

In some embodiment, the system further comprises: a user interface operatively coupled to the controller and configured to send a signal to the controller indicative of a quantity of seeds in the one or more tanks of the product storage system; and wherein the at least one sensor includes a first sensor configured to measure the singulation rate of seeds output from the product storage system; and wherein the controller determines the volume of product in the product storage system based on the determined quantity of seeds in the product storage system and the measured singulation rate received by the controller from the first sensor.

In some embodiments, the user interface is configured to send a signal to the controller indicative of the quantity of fertilizer in the one or more tanks of the product storage system wherein the at least one sensor further includes a second sensor configured to measure a flow rate of fertilizer output from the product storage system; and wherein the controller determines the volume of product in the product storage system based on the indicated quantity of fertilizer in the product storage system and the measured flow rate of fertilizer received by the controller from the second sensor.

In some embodiments, the system further comprises a learning module operatively coupled to the controller and the at least one sensor; wherein the at least one sensor is configured to capture images of a collection of product in the one or more tanks of the product storage system; and wherein the learning module includes instructions that when executed: (i) compare the captured images to prior images of collections of product in product storage tanks, and (ii) identify a volume of the collection of product in the one or more tanks of the product storage system based on stored relationships between the prior images and corresponding volumes of product; wherein the controller determines the volume of product in the product storage system based on the identified volume received from the learning module.

In some embodiments, the at least one sensor includes: a first sensor positioned at a first height in the product storage system and a second sensor positioned at a second height in the product storage system below the first sensor; wherein the first sensor is configured to detect whether a collection of product in the product storage system is positioned level with or above a first sensor and the second sensor is configured to detect whether the collection of product in the product storage system is positioned level with or above the second sensor; and wherein the controller determines the volume of product in the product storage system in response to receiving an indication from the second sensor that the collection of product is no longer equal to or above the second sensor.

In some embodiments, the at least one sensor further includes: a third sensor configured to measure at least one of a singulation rate of seed and a flow rate of fertilizer output from the one or more tanks of the product storage system; wherein the controller is configured to determine the volume of product remaining in the one or more tanks of the product storage system based on the indication from the second sensor and based on at least one of a measured singulation rate of seed and a measured flow rate of fertilizer received from the third sensor.

In some embodiments, the at least one sensor is configured to measure the vibration frequency of the one or more tanks of the product storage system; wherein the controller determines the volume of product in the product storage system based on the measured vibration frequency of the one or tanks of the product storage system.

In some embodiments, the system further comprises at least one additional sensor operatively coupled to the controller and configured to measure or detect a characteristic associated with a row unit or a wheel assembly coupled to the frame of the agricultural machine; and wherein the controller is configured to adjust at least one of the first actuator and the second actuator based on the measured or detected characteristic associated with the row unit or wheel assembly coupled to the frame of the agricultural machine.

In some embodiments, the first wing section includes a wing wheel assembly having a tire, a third actuator having a cylinder configured to adjust a downward force of the tire on the soil, and the at least one additional sensor; wherein the at least one additional sensor is configured to measure a wing wheel assembly characteristic including at least one of a pressure within the cylinder and a pressure within the tire; and wherein the controller is configured to adjust the first actuator based on the measured wing wheel assembly characteristic received from the at least one additional sensor.

In some embodiments, the first wing section includes a wing wheel assembly having a tire and the at least one additional sensor; wherein the at least one additional sensor is configured to capture a first set of images of the soil prior to compaction by the tire and a second set of images subsequent to compaction by the tire; and wherein the controller is configured to adjust the first actuator based on the first set of images and the second set of images captured by the at least one additional sensor.

In some embodiments, the at least one additional sensor includes: (i) a first sensor configured to measure a pressure applied by a cylinder of the row unit, and (ii) a second sensor configured to measure a downforce of the row unit; wherein the controller is configured to compare: (i) the measured pressure applied by the row unit with (ii) a predetermined maximum pressure of the cylinder of the row unit; wherein the controller is configured to compare the measured downforce of the row unit to a desired downforce at the row unit; and wherein, if the controller determines that: (i) the measured downforce is less than the desired downforce and (ii) the measured pressure is at least equal to the maximum pressure, then the controller is configured to adjust at least one of the first actuator and the second actuator based on the measured pressure applied by the row unit and the measured downforce at the row unit, each of which are indications received by the controller from the at least one additional sensor.

In another illustrative embodiment, a method of automatically redistributing weight across a frame of an agricultural machine during operation thereof comprises: determining a volume of product in a product storage system of the agricultural machine, wherein the product storage system is supported by the frame; determining a type of product in the product storage system based on input received from a user interface; determining a weight of the product in the product storage system based on the determined type and determined volume of product in the product storage system; adjusting a first actuator coupled to a center section of the frame and to a first wing section of the frame positioned adjacent to the center section, wherein adjusting the first actuator includes distributing approximately 25% of the determined weight of the product to the first wing section of the frame; adjusting a second actuator coupled to the center section and to a second wing section of the frame positioned adjacent to the center section and opposite the first wing section, wherein adjusting the second actuator includes distributing approximately 25% of the determined weight of the product to the second wing section of the frame; and repeating the determining and adjusting steps throughout operation of the agricultural machine.

In some embodiments, determining the volume of product in the product storage system includes: measuring a shape of a collection of product in the product storage system via at least one of a LIDAR sensor, an ultrasonic sensor, or a stereo camera sensor.

In some embodiments, determining the volume of product in the product storage system includes: determining an initial quantity of product in the product storage system via a user interface; and at least one of: measuring a singulation rate of seeds output from the product storage system; and measuring a flow rate of fertilizer output from the product storage system.

In some embodiments, determining the volume of product in the product storage system includes: capturing images of a collection of product in one or more tanks of the product storage tanks; and comparing the capture images of product in the one or more tanks to prior images of collections of product, wherein the prior images are each associated a volume of product.

In some embodiments, determining the volume of product in the product storage system includes: determining whether a collection of product in the product storage system is positioned at a height that is level with or above a first sensor positioned at a first height in the product storage system; and determining whether the collection of product in the product storage system is positioned at a height that is level with or above a second sensor positioned at a second height in the product storage system, wherein the second sensor is positioned below the first sensor.

In some embodiments, determining the volume of product in the product storage system further includes: measuring with a third sensor at least one of: a singulation rate of seeds output from the product storage system; and a flow rate of fertilizer from output from the product storage system.

In some embodiments, determining the volume of product in the product storage system further includes: comparing the volume as determine from the second sensor with the volume as determined from the third sensor; identifying an error constant based on the difference between the volume as determine from the second sensor and the volume as determined from the third sensor; and updating the determined volume of product in the product storage system based on the error constant.

In another illustrative embodiment, a method of automatically redistributing weight across a frame of an agricultural machine during operation thereof comprises: determining the weight of a measured volume of product within a product storage system supported by the frame, wherein determining the weight of the measured volume of product includes measuring or detecting, with a first set of one or more sensors, a characteristic associated with the product in the product storage system; measuring, with a second set of one or more sensors, a first operational characteristic of the agricultural machine, wherein the first operational characteristic is associated with one or more row units or one or more wheel assemblies coupled to the frame of the agricultural machine; measuring, with a third set of one or more sensors, a second operational characteristic of the agricultural machine, wherein the second operational characteristic is also associated with one or more row units or one or more wheel assemblies coupled to the frame of the agricultural machine; comparing the first measured operational characteristic with the second measured operational characteristic; and adjusting an actuator coupled to a center section of the frame and to a wing section of the frame to redistribute the weight of the measured volume of product based on the comparison between the first measured operational characteristic and the second measured operational characteristic.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 8 illustrates a flow chart of another control method for redistributing weight laterally across the frame using components of the control system of FIG. 4.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
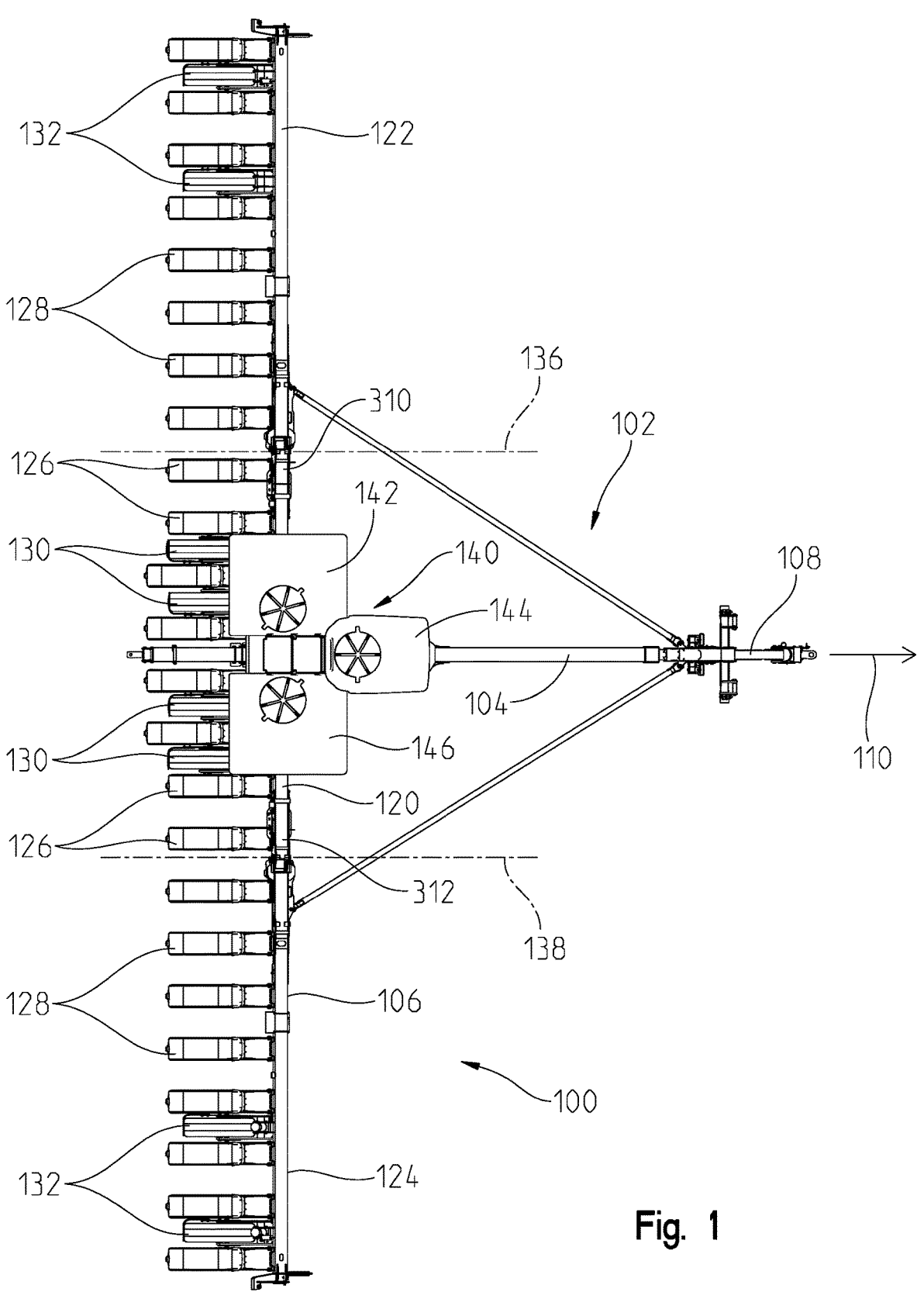
FIG. 1 illustrates a top-down view of an agricultural machine having a frame with actuators for adjusting weight distribution laterally between sections of the frame.

In FIG. 1 of the present disclosure, an illustrative embodiment of an agricultural machine 100 is shown as a row crop planter. The agricultural machine 100 is illustrated as including a frame 102 having a draw bar 104 and a tool bar 106 spanning laterally to define a width thereof. At the forward end of the draw bar 104 is a tongue 108 for coupling the frame 102 to a towing vehicle such as a tractor. The tool bar 106 is shown as having a center section 120, a first wing section 122, and a second wing section 124. The first and second wing sections 122, 124 extend laterally away from the main section 120 in opposite directions. During operation, a towing vehicle, such as a tractor, may pull the agricultural machine 100 in a forward direction 110, as shown in FIG. 1.

The first and second wing sections 122, 124 may be pivotably coupled to the center section 120 for rotation about fore and aft extending axes 136 and 138. The pivot-type connection allows the wing sections to follow the ground contour as the agricultural machine 100 moves through a field. A first plurality of row units 126 may be coupled to the center section 120 and function as center section ground engaging tools. A second plurality of row units 128 may be coupled to the first and second frame wing sections 122, 124 and form wing section ground engaging tools. In aspects of the disclosure described herein, the first and second plurality of row units 126 and 128 may be identical. Thus, it should be appreciated that description of the row units 128 applies equally to the row units. Further, description of a single component (e.g., row unit or wheel assembly) should be understood to apply to the corresponding plurality of those components.

The agricultural machine 100 may also include a product storage system 140 mounted to the center section 120 of the frame 102. The product storage system 140 may include product bins or tanks, 142, 144 and 146, as shown in FIG. 1 for example. The tanks 142, 144, 146 may hold seed that is delivered pneumatically to mini-hoppers 24 on the row units 126, 128 (see FIG. 3). In other embodiments, the tanks may hold dry or liquid fertilizer or water that is used to dilute a concentrated insecticide or other chemical to be applied. In some embodiments, the agricultural machine 100 may include additional tanks, which may be positioned on the draw bar 104, the center section 120 of the tool bar 106, or the struts extending between the tool bar 106 and the draw bar 104. The additional tanks may include, for example, seed or fertilizer.

Referring still to FIG. 1, the agricultural machine 100 is shown including main wheel assemblies 130 coupled to and supporting the center section 120 of the tool bar 106 for movement over the ground. Moreover, wing wheel assemblies 132 are coupled to the first and second wing sections 122, 124 for supporting the wing sections 122, 124 for movement over the ground. Thus, each of the wheel assemblies 130, 132 may be referred to as ground engaging tools. It should be appreciated that, in some embodiments, the wheels may be replaced by continuous tracks yet otherwise function in the same manner as described herein.

Figure 2:
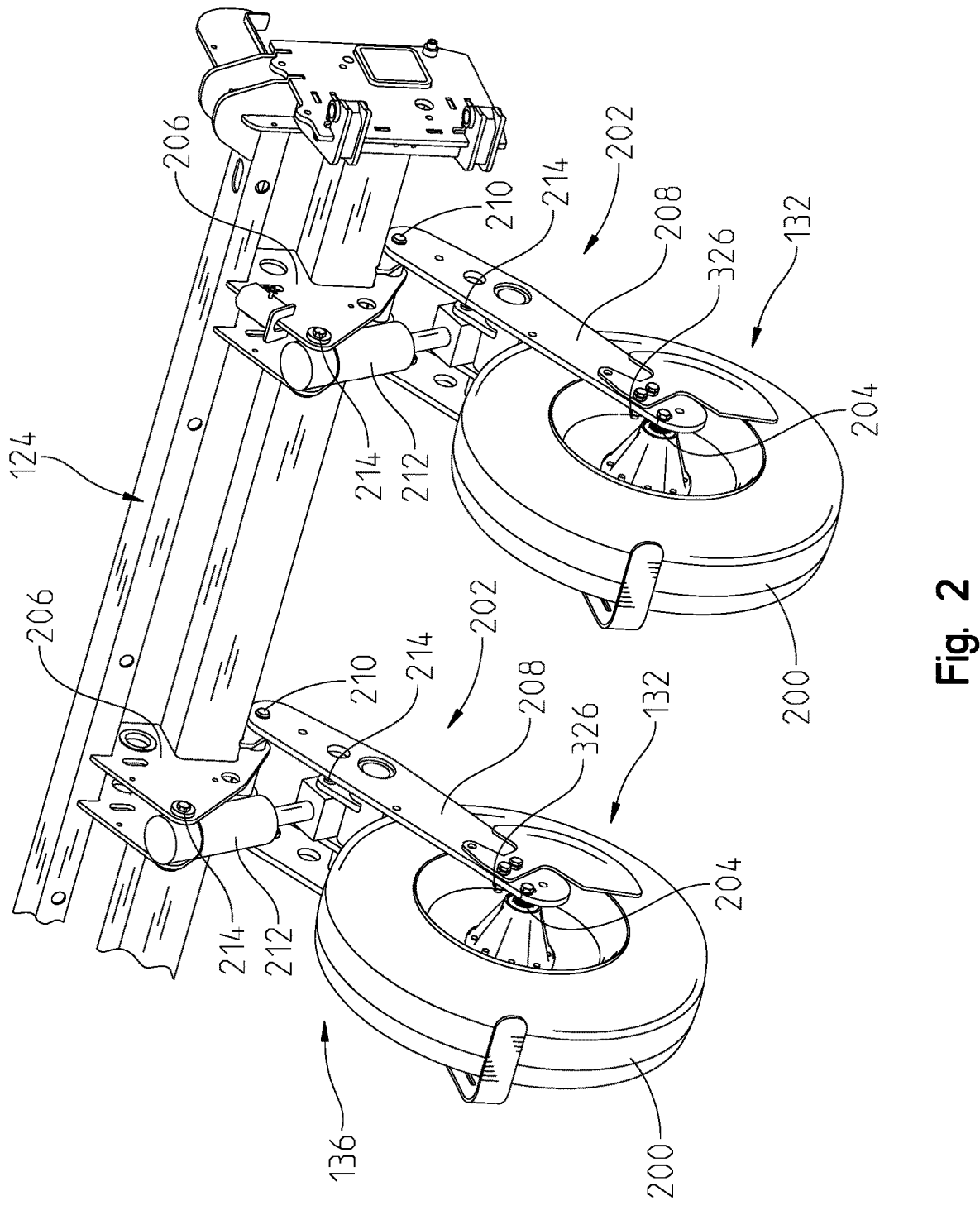
FIG. 2 illustrates a perspective view of a wheel assembly of the agricultural machine.

In FIG. 2, a pair of wing wheel assemblies 132 are shown coupled to the second wing section 124. Each wing wheel assembly 132 may include a tire or wheel 200 mounted to a support structure 202 for rotation on an axle 204. The support structure 202 includes a mounting bracket 206 secured to the wing section 124 and to a lift arm 208. The lift arm 208 may be pivotably connected to the bracket 206 by a pin 210. The second wing section 124 may be raised or lowered by operation of one or more actuators 212 (e.g., hydraulic cylinders) coupled between the lift arms 208 and mounting brackets 206 which are in turn secured to the wing section 124. Both the rod end and the base end of each cylinder 212 may be attached to the lift arms 208 and mounting brackets 206 by pins 214. It should be appreciated that the actuators described throughout this disclosure may be hydraulic, electric, or of any other type capable of moving or applying force to nearby components. The main wheel assemblies 130 may have similar components as the wing wheel assemblies 132, namely wheels, tires or tracks, lift arms and actuators. The main wheel assemblies 130 may have components sized to carry larger loads than the wing wheel assemblies 132, which are otherwise similar such that the description of the wing wheel assemblies 132 applies equally to the main wheel assemblies 130.

Figure 3:
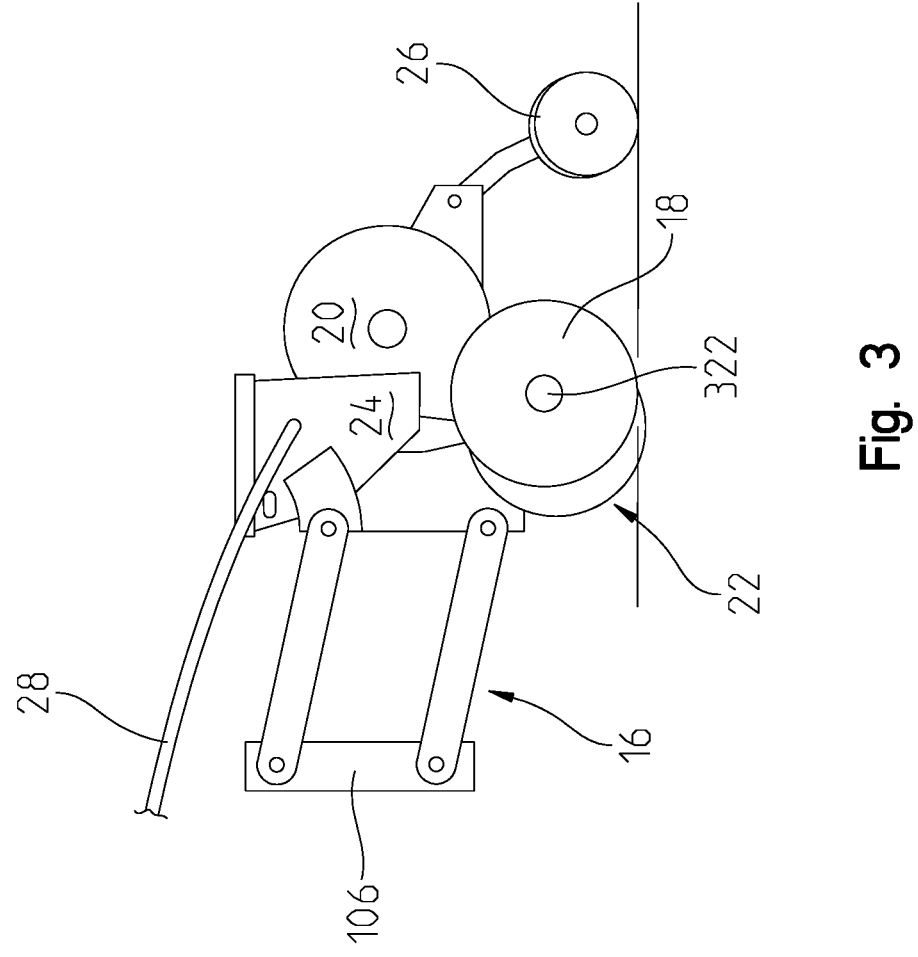
FIG. 3 illustrates a side view of a row unit of the agricultural machine, which is coupled to the frame.

An exemplary row unit 128 is shown in FIG. 3. The row unit 128 may include a row unit frame attached to the tool bar 106 by a linkage assembly 16 including parallel arms as shown. The linkage assembly may allow up and down movement of the row unit 128 relative to the tool bar 106 (e.g., second wing section 124) to follow ground contours. The row unit frame may support a double disc type furrow opener 22 for forming a seed furrow in the soil or ground. A gauge wheel 18 may be provided adjacent the opener 22.

The gauge wheel 18 functions as furrow depth regulation member, associated with the disc furrow opener 22. The gauge wheel 18 may be vertically adjustable relative to the furrow opener 22 to vary the depth of the furrow which is cut into the soil by the disc furrow opener 22. In some embodiments, a gauge wheel sensor 322 may be coupled to and/or positioned on the gauge wheel 18. The gauge wheel sensor 322 is configured to measure the downforce of the row unit 128. The gauge wheel sensor 322 is operatively coupled to a controller 150, which is described below. The gauge wheel sensor 322 is configured to send a signal to the controller 150 indicative of the measured downforce of the gauge wheel 18 of the row unit 128.

Referring still to FIG. 3, a seed meter 20, which may also be carried by the row unit frame, receives seed or other product from the product storage system 140. Seed or other product may be delivered to the mini-hopper 24 from the product storage system 140 by any conventional pneumatic distribution system, such as the one described in U.S. Pat. No. 6,688,244, the disclosure of which is incorporated herein by reference, or by any other suitable system. An exemplary hose 28 of the pneumatic distribution system is shown in FIG. 3. In other embodiments, the seed meter 20 may be arranged in other locations along the flow path of seed from the product storage system 140 to the soil. The row unit 128 may also include a pair of closing wheels 26 which follow behind the gauge wheel 18 and are positioned generally in line with furrow opener 22. The closing wheels 26 may push soil back into the furrow upon the seed or product being deposited therein.

Figure 4:
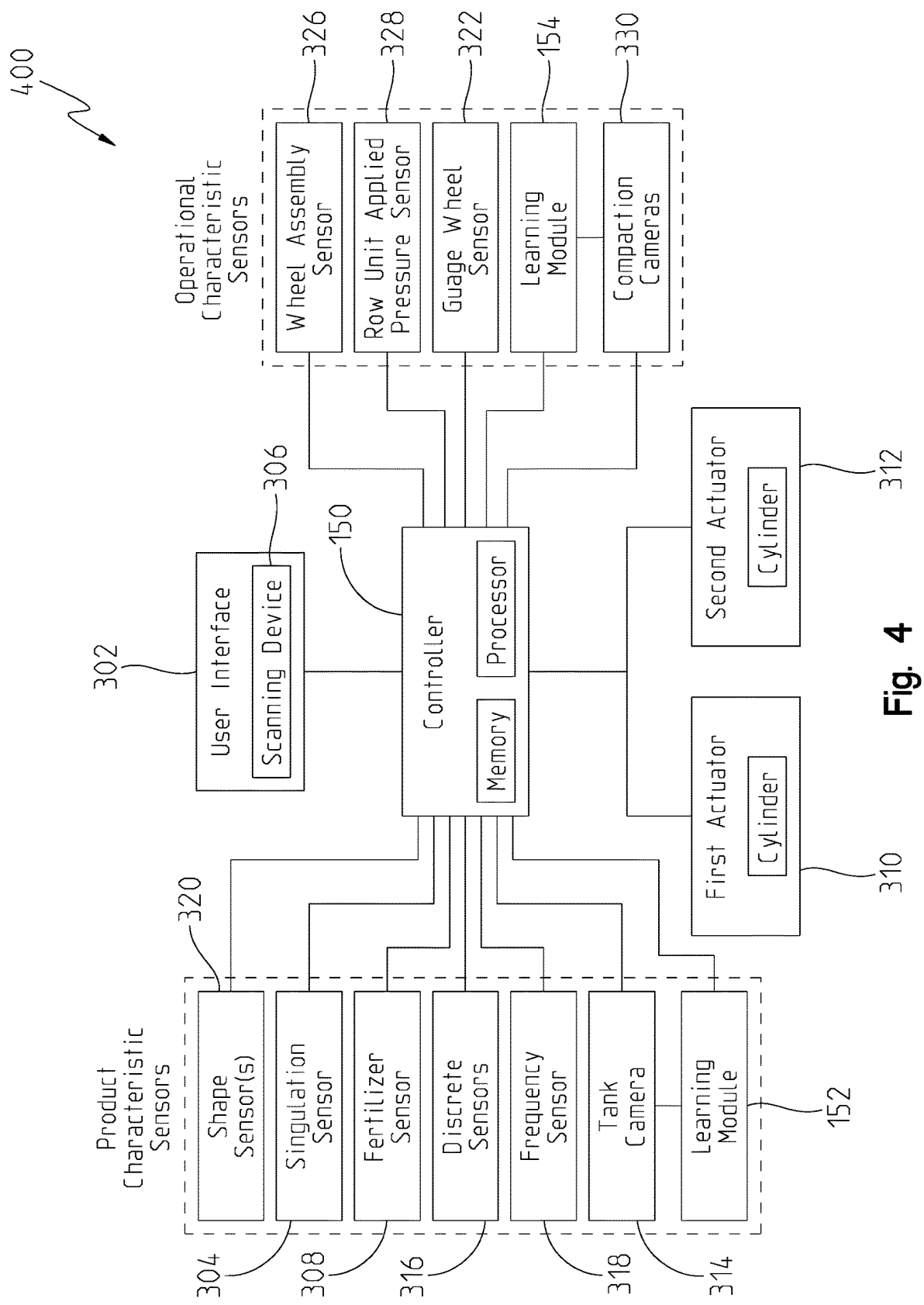
FIG. 4 illustrates a diagrammatic view of a control system for the agricultural machine.

Referring now to FIG. 4, a diagrammatic view of a control system 400 of the agricultural machine 100 is shown. For example, the agricultural machine 100 includes the controller 150. The controller 150 may include a memory and a processor configured to execute instructions (i.e., algorithmic steps) stored on the memory. The controller 150 may be a single controller or a plurality of controllers operatively coupled to one another. The controller 150 may be hardwired or connected wirelessly to other components of the control system 400 via Wi-Fi, Bluetooth, or other known means of wireless communication. The controller 150 may be housed by the agricultural machine 100 or positioned remotely, away from the agricultural machine 100.

The controller 150 may be operatively coupled to a user interface 302 and configured to receive input data from the user via the user interface 302. For example, a user may input via the user interface 302 the type of product(s) (e.g., type of seed or fertilizer) being utilized in an agricultural operation and stored in the product storage system 140. In another example, a user may input a quantity of product loaded or to be loaded into the product storage system 140. In some embodiments, the user interface 302 may include an scanning device 306 (e.g., a mobile device or dedicated scanning tool) operatively coupled to the controller 150 and configured to scan a bar code or other indicia of a separate container (e.g., that of a seed bag) to identify the quantity of product or type of product within the separate container. It should be appreciated that the product of the one or more separate containers may be used to fill the one or more tanks of the product storage system 140, and a user may use the scanning device 306 to scan the one or more separate containers as the product is added to the tanks. The scanning device 306 is configured to send a signal to the controller 150 indicative of the identified quantity and/or type of product with the one or more separate containers.

Referring still to FIG. 4, control system 400 may further include one or more sensors 320 configured to measure the volume of seed or other product within one or more tanks of the product storage system 140. Specifically, the one or more sensors 320 are configured to measure the shape of a collection of product within the one or more tanks of the product storage system 140. Thus, the one or more sensors 320 may be referred to as shapes sensors. The one or more sensors 320 may be for example an ultrasonic sensor, a LIDAR sensor, and/or a stereo camera with a reference target positioned in a predetermined location within the one or more tanks. In some embodiments, the geometry of a tank is known and stored in the memory of the controller 150, which makes use of the one or more sensors 320 more effective (i.e., more accurate) in determining the volume of product in the one or more tanks. The ultrasonic sensor may omit radio frequency waves, whereas the LIDAR sensor may emit optical as well as radio frequency waves. In any event, the one or more sensors 320 are configured to measure the volume of product (e.g., seed or fertilizer) in the one or more tanks. The one or more sensors 320 are operatively coupled to the controller 150 and configured to send a single thereto indicative of the volume of product in the one or more tanks. Thus, the controller 150 is configured to determine the volume of product in the one or more tanks based on measurements from the one or more sensors 320. As shown in FIG. 4, the one or more shape sensors 320 are an example of product characteristic sensors, which measure or detect a characteristic associated with the product stored in the product storage system 140.

In an exemplary embodiment, the agricultural machine 100 may also include a sensor 304, as shown in FIG. 3, positioned on the row unit 128. The sensor 304 is configured to measure the singulation rate of the seeds (e.g., seeds per acre). Thus, the sensor 304 may be referred to as a singulation sensor 304. It should be appreciated that the singulation rate may be measured by one or more sensors positioned on various locations of the agricultural machine 100, and the sensor 304 is merely one example of the structure and arrangement of the one or more seed singulation rate sensors. As shown in FIG. 4, the singulation sensor 304 is another example of a product characteristic sensor. As shown in FIG. 4, the sensor 304 is included in the control system 400 and is operatively coupled to the controller 150 and configured to send a signal to the controller 150 indicative of the measured singulation rate, which corresponds to the number of seeds output from one or more tanks of the product storage system 140 in an amount of time or over a distance or area of travel of the agricultural machine 100. Thus, the controller 150 is configured to continuously determine the volume of the seeds left in the one or more tanks of the product storage system 140 based on the identified quantity of seeds initially added to the one or more tanks (e.g., via input received from the user interface 302) and the measured singulation rate received from the singulation sensor 304.

In an exemplary embodiment, the agricultural machine 100 may also include a sensor 308 positioned in or adjacent to a flow path of the fertilizer, as shown for example in FIG. 3. The sensor 308 is configured to measure the flow rate of liquid or other fertilizer being distributed, and therefore, the sensor 308 may also be referred to as a fertilizer sensor or flow rate sensor 308. It should be appreciated that the fertilizer flow rate may be measured by one or more sensors positioned on various locations of the agricultural machine 100, and the sensor 308 is merely one example of the structure and arrangement of the one or more fertilizer sensors. As shown in FIG. 4, the fertilizer sensor 308 is another example of a product characteristic sensor. As shown in FIG. 4, the sensor 308 is included in the control system 400 and is operatively coupled to the controller 150 and configured to send a signal to the controller 150 indicative of the measured flow rate of fertilizer output from the one or more tanks of the product storage system 140. The controller 150 is configured to continuously determine the volume of the fertilizer remaining in the one or more tanks of the product storage system 140 based on the identified quantity of fertilizer added to the tanks (e.g., via input received from the user interface 302) and the measured flow rate received from the sensor 308.

Referring still to FIG. 4, the control system 400 may further include one or more sensors 314 (e.g., cameras), which in some embodiments are positioned in or adjacent to the one or more tanks of the product storage system 140. The one or more sensors 314 maybe referred to as cameras or tank cameras 314. As shown in FIG. 4, the tank cameras 314 are another example of product characteristic sensors. The one or more cameras 314 are operatively coupled to the controller 150. In some embodiments, the cameras 314 are operatively coupled to a learning module 152, which is operatively coupled to the controller 150. The learning module 152 includes a collection of software, which in some embodiments, is arranged in the cloud. The learning module 152 is configured to determine the volume of product in the one or more tanks of the product storage system 140 based on images received from the one or more cameras 314. The learning module 152 may include and may be used to execute, for example, the following algorithm (i.e., step-by-step procedure) to perform the function of determining the volume of product in the one or more tanks of the product storage system 140: (i) receive images from the one or more cameras 314, (ii) compare the images received the from the one or more cameras 314 to images received at a prior time, (iii) identify the volume of product associated with the images received at a prior time (e.g., based on stored relationships between the images received at a prior time and associated product volumes), and (iv) send a signal to controller 150 indicative of the volume of product associated with one or more images received at the prior time. As a result, based on input from the cameras 314 and based on input from the learning module 152, the controller 150 is configured to determine the volume of product in the one or more tanks of the product storage system 140.

Referring still to FIG. 4, the control system 400 may further include a plurality of discrete sensors 316 positioned in or adjacent to the one or more tanks of the product storage system 140. As shown in FIG. 4, the discrete sensors 316 are another example of product characteristic sensors. In some embodiments, the control system 300 may include discrete sensors 316 positioned at certain levels of a tank including: full, ¾, ½, ¼, and empty. In other embodiments, the discrete sensors 316 may be positioned at other levels of the tank. Thus, the one or more discrete sensors 316 are each configured to determine whether the volume of product in a tank is less than the volume of the tank below that discrete sensor 316. In other words, each discrete sensor 316 determines whether the volume of product is: (a) below the level at which the discrete sensor 316 is positioned, or (b) at or above the level at which the discrete sensor 316 is positioned. Each discrete sensor 316 is operatively coupled to the controller 150 and configured to send a notification to the controller 150 when the level of product in the one or more tanks of the product storage system 140 falls below that discrete sensor 316.

In some embodiments, the controller 150 uses input from the singulation sensor 304 and/or the fertilizer sensor 308 in combination with input from the discrete sensors 316 to determine the volume of product in the one or more of the tanks of the product storage system 140. For example, each time a discrete sensor 316 sends a notification to the controller 150, the controller 150 replaces the volume as determined from the singulation sensor 304 with the volume as determined from the notification from the discrete sensor 316. Subsequently, the controller 150 continues to determine the volume based on new input from the singulation sensor 304. The process steps above are repeated each time the controller 150 receives another notification from another discrete sensor 316.

As a separate process, input from the singulation sensor 304 and input from the discrete sensors 316 are both used by the controller 150, wherein, if the input received from the singulation sensor 304 does not match the input received from the discrete sensor 316, then the controller 150 stores an error constant in its memory equal to the difference in volume based on the different input by the two sensors 304, 316. The controller 150 increases the error constant proportionally over time and adds the increased error constant to the volume determined by the singulation sensor 304. It should be appreciated that each of the combined processes described above are executable by the controller 150 based on fertilizer flow rate as well (via sensor 308). Therefore, based on the notification from the discrete sensors 316 and input from at least one of the singulation sensor 304 and the fertilizer sensor 308, the controller 150 is configured to determine the volume of product in the one or more tanks of the product storage system 140.

In some embodiments, the control system 400 may further include a sensor 318 configured to measure the frequency of one of more tanks (or of the adjacent support structures) of the product storage system 140. Thus, the sensor 318 may be referred to as a frequency sensor. For example, a tank that is full of product will resonate at a different frequency than a tank that is half filled with product. More specifically, the full tank will have a dampened frequency as compared to the half filled tank. In some embodiments, the sensor 318 may be a strain gauge or other frequency-measuring instrument coupled to a tank or to an adjacent support structure for the product storage system 140. In other embodiments, the process is executable via feedback from an audio sensor, which may determine various audible characteristics of the agricultural machine 100 corresponding to volume of product. In any event, as shown in FIG. 4, the frequency sensor 318 is another example of a product characteristic sensor. As shown in FIG. 4, the sensor 318 is operatively coupled to the controller 150 and configured to send a signal to the controller 150 indicative of the measured frequency. Based on stored relationships between frequencies and corresponding volumes of product in the one or more tanks of the product storage system 140, the controller 150 is configured to determined the volume of product in the product storage system 140 based on the measured frequency.

Based on the volume determinations described above, the controller 150 is configured to determine the weight of the product in the one or more tanks. For example the controller 150 receives an indication of the type of product(s) via the user interface 302, and is configured to determine the weight of a predetermined volume of each product based on stored relationships in the memory. For example, the controller 150 may multiply the weight of the predetermined volume of product by the volume of product in the tank to determine the weight of the product in the tank.

Referring still to FIG. 4, control system 400 may further include a first actuator 310 having a first cylinder and a second actuator 312 having a second cylinder. The first actuator 310 and the second actuator 312 are shown in FIGS. 1 and 4. As shown in FIG. 4, the controller 150 is operatively coupled to the first and second actuators 310, 312 and configured to send signal to the actuators 310, 312 causing their respective cylinders to extend or retract. In FIG. 1, the first actuator 310 is shown as being positioned between and coupled to the center section 120 of the frame 102 and the first wing section 122 of the frame 102. Likewise, the second actuator 312 is shown as being positioned between and coupled to the center section 120 of the frame 102 and the second wing section 124 of the frame 102. In the illustrative embodiment, the actuators 310, 312 span across the fore and aft extending axes 136, 138, respectively. As the cylinders extend and retract, more or less force may be applied to the respective wing sections 122, 124 from the center section 120.

In this disclosure, the control system 400 may be used in control methods 500, 600, 700, and 800, which are described as methods for controlling weight distribution across the frame 102 based on a measured volume of products that are stored in the product storage system 140. This disclosure is most applicable to embodiments in which at least a portion of product weight is supported by the frame 102, and in particular by the center section 120 of the frame 102. After the weight of the product is known, the product weight (e.g., a percentage of the product weight) may be redistributed according to the step-by-step processes described herein.

Figure 5:
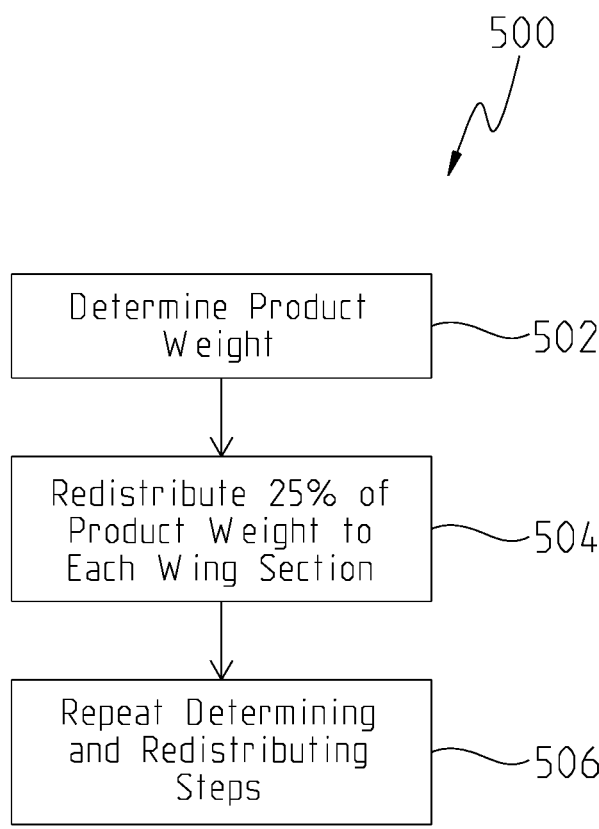
FIG. 5 illustrates a flow chart of a control method for redistributing weight laterally across the frame using components of the control system of FIG. 4.

Regarding control method 500, it has been discovered that, at times, it is advantageous to proportionally distribute the product weight between the center section 120 and each wing section 122, 124 of the frame 102 such that the center section 120 retains approximately 50% of the product weight and each wing section 122, 124 receives approximately 25% of the product weight. Control method 500 is shown in FIG. 5. As shown in step 502, the controller 150 determines the product weight. As shown in step 504, based on the product weight, the controller 150 sends a signal to each actuator 310, 312 to adjust the respective cylinders (by a change in distance and/or change in pressure) sufficient to cause approximately 25% of the product weight to be transferred to each wing section 122, 124. As shown in step 506, the weight and/or volume-determining step and the actuator-adjustment steps of this process are repeated throughout an operation of the agricultural machine 100. As such, the weight of the product remains proportionally distributed between the center section 120 and each wing section 122, 124 of the frame 102 during the planting, fertilizing, or other operation of the agricultural machine 100.

Regarding control method 600, it has been discovered that, at times, it is advantageous to diverge from a proportional distribution of product weight across the frame 102. For example, in laterally uneven terrain, the row units 128 of one or both wing sections 122, 124 may not maintain sufficient contact with the ground, which causes reduce planting efficacy. This problem may be referred to as "floating the wings," and it may result from having insufficient downforce at the row units 128 that are coupled to the wing sections 122, 124.

Achieving the correct downforce of the row units 128 is important because it allows seed to be planted at the proper depth. Downforce margin is calculated as the inherent weight of a row unit 128, plus the downward force applied by the row unit 128, minus the soil penetration resistance. The downward force applied by the row unit 128 itself may be measured in terms of pressure applied by a cylinder of the row unit 128. The row unit 128 may apply downforce with various different structures depending on the embodiment. For example, in some embodiments, the row unit 128 includes a pneumatic system, and in other embodiments, the row unit 128 includes a hydraulic system, such as an Individual Row Hydraulic Downforce system (IRHD), which is a hydraulic actuator configured to force the row unit 128 downward toward the soil. The structures mentioned above apply downward force (via cylinder pressure) to allow the opening disc 22 to reach and maintain a targeted planting depth. In some embodiments, the control system 400 includes a row unit applied pressure sensor 328 configured to measure the pressure applied by the row unit 128. As shown in FIG. 4, the row unit applied pressure sensor 328 is an example of an operational characteristic sensor, which measures or detects a characteristic associated with a ground engaging tool of the agricultural machine, such as a row unit 126, 128 or a wheel assembly 130, 132. In some embodiments, the row unit applied pressure sensor 328 may be coupled to or positioned on a cylinder of the pneumatic or hydraulic cylinder to determine the pressure therein. In any event, the row unit applied pressure sensor 328 is operatively coupled to the controller 150 and configured to send a signal to the controller 150 indicative of the pressure in the cylinder of the row unit 128, which corresponds to the downward force applied by the row unit 128, on its own.

While, in some instances, the weight of the row unit 128 and the applied downward force from the row unit 128 may be sufficient to allow the opener 22 to reach a desired planting depth, in other instances, additional downward force above and beyond that may be required to maintain required planting depth while account for changing field conditions. After the available product weight is determined (e.g., via the control system 400), a portion of the product weight can be transferred to the wing sections 122, 124 to provide additional downward force for the row units 128 as needed.

Figure 6:
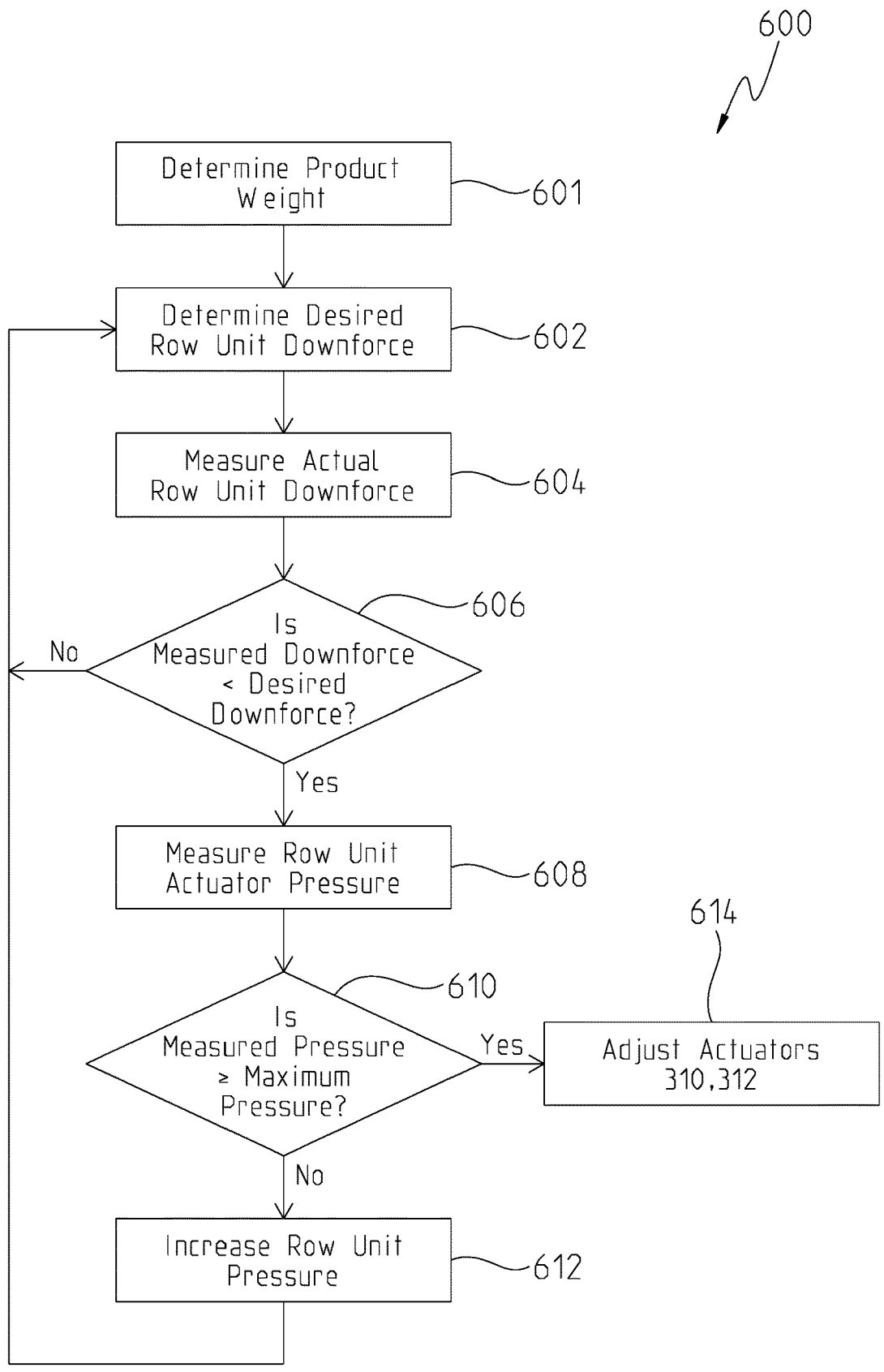
FIG. 6 illustrates a flow chart of another control method for redistributing weight laterally across the frame using components of the control system of FIG. 4.

Thus, as described by control method 600 in FIG. 6, to solve the floating wings problem, at least three things are required: (i) automatic identification of the floating wings during operation of the agricultural machine, (ii) automatic determination of the amount of product weight available to be transferred from the center section 120 of the frame 102 to each wing section 122, 124 of the frame 102, and (iii) automatic transfer of weight from the center section 120 of the frame 102 to each wing section 122, 124 of the frame 102 in response to identification of the problem.

Regarding the control method 600 shown in FIG. 6, at step 602, the controller 150 is configured to determine the desired downforce at the row unit 128. In some embodiments, the desired downforce value may be received by the controller 150 from the user interface 302 as input from the user. At step 604, the gauge wheel sensor 322 is configured to measure the downforce (i.e., pressure) of the row unit 128 and send a signal to the controller indicative of the same. At a step 606, the controller 150 is configured to compare the measured downforce received via the gauge wheel sensor 322 to desired the downforce for the row units 128 of each of the wing sections 122, 124. As shown at step 608, the row unit applied pressure sensor 328 is configured measure the pressure the cylinder of the row unit 128, which is received by the controller 150. At step 610, the controller 150 compares the received pressure measurement to values stored in the memory to determined whether the received pressure measurement is equal to a predetermined maximum pressure value for the cylinder. As shown at step 610, if the controller 150 determines that the cylinder of the row unit 128 is at a maximum pressure (i.e., maximum row unit downforce) and determines that the measured downforce via the gauge wheel sensor 322 is less than the desired downforce (step 606), then in response, the controller 150 sends a signal to the actuator 310, 312 corresponding to the floating wing section 122, 124 to cause the actuator 310, 312 to extend or retract, which shifts weight from the center section 120 of the frame 102 to the desired wing section 122, 124. It should be appreciated that, prior to transferring weight to a wing section 122, 124, at a step 601, the controller 150 determines the weight of the product in the product storage system 140. Thus, the amount of weight available to be transferred is determined prior to distributing a percentage of the weight to the floating wing section 122, 124. It should also be appreciated that, as shown in FIG. 4, the gauge wheel sensor 322 is another example of an operational characteristic sensor.

Figure 7:
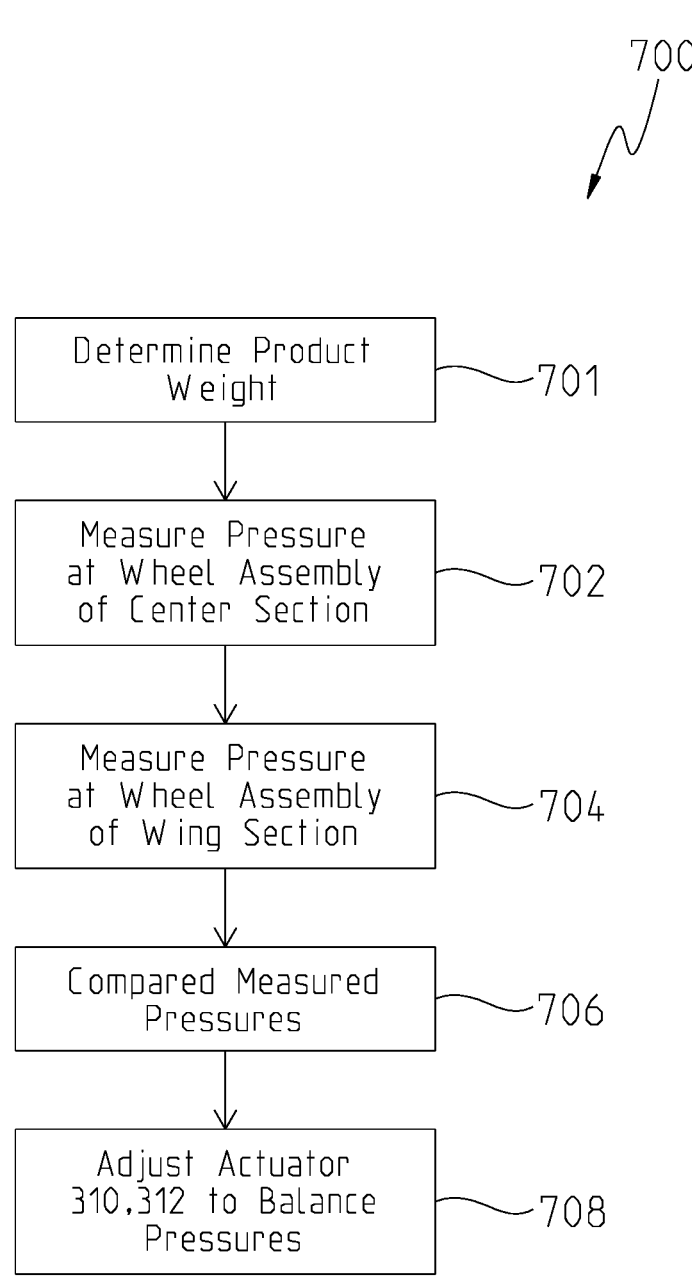
FIG. 7 illustrates a flow chart of another control method for redistributing weight laterally across the frame using components of the control system of FIG. 4.

Referring now to FIG. 7, a control method 700 is shown. As suggested by the control method 700, at times, it may be advantageous to balance the force applied at each wheel assembly 130, 132. Accordingly, at step 702 the force or pressure at each wheel assembly 130, 132 may be measured. At step 704, the measured characteristic of the wheel assembly 130 may be compared to the measured characteristic of the wheel assemblies 132. At step 706, product weight be may be transferred to the wing sections 122, 124 or to the center section 120 of the frame 102 based on the result of the comparison and based on the determined weight of product in the product storage system 140.

Specifically, each wheel assembly 130, 132 includes one or more wheel assembly sensors 326, which are operatively coupled to the controller 150 and configured to send a signal thereto indicative of the force applied at the wheel assembly 130, 132. As shown in FIG. 4, the wheel assembly sensor 326 is another example of an operational characteristic sensor. In the illustrative embodiment shown in FIG. 2, the wheel assembly sensor 326 is illustrated as a tire pressure sensor configured to measure a pressure of the tire 200 and configured to send a signal to the controller 150 indicative of the same. In other embodiments, the wheel assembly sensor 326 may be an actuation sensor configured to measure a pressure or extension distance of the cylinder 212. In such an embodiment, the actuation sensor is operatively coupled to the controller 150 and configured to send a signal to the controller 150 indicative of the measured pressure or extension distance of the cylinder 212. In any event, as suggested by steps 702, 704, the one or more wheel assembly sensors 326 are configured to measure a characteristic (e.g., tire or cylinder pressure) corresponding to the downward force applied at the wheel assemblies 130, 132. As shown in step 706, the controller 150 is configured to compare the measured pressure at wheel assemblies 130 to the measured pressure at wheel assemblies 132. At step 708, based on the determined pressure at each wheel assembly 130, 132, the controller 150 is configured to send signals to the actuators 310, 312 to adjust the weight distributed to the wing sections 122, 124 to balance the pressures of the wheel assemblies 130, 132. It should be appreciated that at step 701, prior to transferring weight to a wing section 122, 124, the controller 150 determines the weight of the product in the product storage system 140. Thus, the amount of weight available to be transferred is determined prior to distributing a percentage of the weight to wing sections 122, 124 to balance the pressure at each wheel assembly 130, 132.

Referring control method 800, at times, it may be advantageous to balance the soil compaction at various portions of the frame 102. For example, each wheel assembly 130, 132 may include one or more cameras 330 arranged to capture images of the soil compaction of each wheel. These cameras may be referred to as compaction cameras or sensors 330. As shown in FIG. 4, the compaction cameras 330 are another example of operational characteristic sensors. Specifically, a first camera may be arranged to capture images of the soil compacted by the wheels at the wing assemblies 130 and additional cameras may be arranged to capture images of the soil compacted by the wheels 200 at the wheel assemblies 132. Each camera is operatively coupled to the controller 150 and configured to send images to the controller 150 of the compacted soil. The controller 150 may compare the degree of compaction based on images received from the first camera to the degree of compaction based on images received from the additional cameras. Based on the comparison, the controller 150 is configured to send signals to the actuators 310, 312 to adjust the weight distributed to the wing sections 122, 124 to balance the compaction of each wheel. It should be appreciated, for example, at step 801, that prior to transferring weight to a wing section 122, 124, the controller 150 determines the weight of the product in the product storage system 140. Thus, the amount of weight available to be transferred is determined prior to distributing a percentage of the weight to wing sections 122, 124 to balance the degree of compaction from the wheels of each section of the frame 102.

In some embodiments, the cameras 330 are operatively coupled to a learning module 154, which is operatively coupled to the controller 150. The learning module 154 includes a collection of software, which in some embodiments, is arranged in the cloud. The learning module 154 is configured to determine the degree of compaction based on images received from the one or more cameras 330. The learning module 154 may comprise and may be used to execute, for example, the following algorithm (i.e., step-by-step procedure) to perform the function of determining the degree of soil compaction: (i) receive images from the one or more cameras 330, (ii) compare the images received the from the one or more cameras 330 to images received at a prior time, (iii) identify the degree of compaction associated with the images received at a prior time (e.g., based on stored relationships between the images received at a prior time and soil compaction), (iv) receive input regarding field characteristics (e.g., soil type), (v) send a signal to controller 150 indicative of the degree of compaction based on the one or more images received at the prior time and the current soil type. As a result, based on input from the cameras 330 and input from the learning module 154, the controller 150 is configured to determine the degree of soil compaction for the wheels associated with each section of the frame 102, respectively.

In some embodiments, the cameras 330 may be replaced by or used in combination with one or more other sensors 332 configured to measure the degree of soil compaction. The one or more other sensors 332 may be for example an ultrasonic sensor or a LIDAR sensor. Each of the more or more other sensors 332 are operatively coupled to the controller 150 and configured to send a signal to the controller 150 associated with a degree of soil compaction.

Referring still to FIG. 8, in some embodiments, the one or more cameras 330 and/or the one or more other sensors 332 may include a first set of cameras and/or other sensors and a second set of cameras and/or other sensors. As suggested by step 802, the first of set of cameras and/or other sensors are arranged to capture images of the soil prior to compaction by the wheels 200 of each wing section 122, 124 of the frame 102. As suggested by step 804, the second set of cameras and/or other sensors are arranged to capture images of the soil subsequent to compaction by the wheels 200. Based on the images received from the cameras and/or other sensors, the controller 150 is configured to determine the change in compaction of the soil based on compaction by the wheels 200 of the wing sections 122, 124. Additionally, at steps 806, 808, the cameras and/or other sensors measure the soil at the wheel assembly 130 of the center section 120 before and after the wheels compact the soil. Based on the images received from the cameras and/or other sensors, the controller 150 is configured to determine the change in compaction of the soil based on compaction by the wheels of the center section 120. At step 810, the controller 150 is configured to compare the change in compaction at the center section 120 of the frame 102 to the change in compaction at the wing sections 122, 124 of the frame 102. Based on the comparison, the controller 150 is configured to send signals to the actuators 310, 312 to adjust the weight distributed to the wing sections 122, 124 to balance the compaction. It should be appreciated that, at step 801, prior to transferring weight to a wing section 122, 124, the controller 150 determines the weight of the product in the product storage system 140. Thus, the amount of weight available to be transferred is determined prior to distributing a percentage of the weight to wing sections 122, 124 to balance the soil compaction of the wheels of each section of the frame 102.

An approximated value, as the term is used herein, describes a range of values immediately surrounding a specified value, and more particularly describes the specified value plus or minus an error constant sufficient to adjust for delay in process steps described herein and/or variation from the specified value as a result of normal ware and tear on the agricultural machine 100.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A system for automatically redistributing weight across a frame of an agricultural machine during operation thereof, the system comprising:

the frame including: a center section, a first wing section coupled to the center section, and a second wing section coupled to the center section and positioned opposite the first wing section;

a product storage system supported by the center section and including one or more tanks configured to store product usable in an operation of the agricultural machine;

a first actuator coupled to the center section and to the first wing section;

a second actuator coupled to the center section and to the second wing section; and at least one sensor configured to measure or detect a characteristic associated with the product stored in the product storage system;

a first wheel assembly sensor configured to measure or detect a first characteristic associated with a first downward force applied at a first wheel assembly coupled to the first wing section;

a second wheel assembly sensor configured to measure or detect a second characteristic associated with a second downward force applied at a second wheel assembly coupled to the second wing section;

a controller operatively coupled to the first actuator, the second actuator, and the at least one sensor;

wherein the controller is configured to determine the volume of product in the product storage system based on at least one measured or detected characteristic associated with the product and received from the at least one sensor;

wherein the controller is configured to determine, using the volume of product, a weight of the product in the product storage system available for transfer;

wherein the controller is configured to adjust at least one of the first actuator and the second actuator to redistribute weight across the frame based on a comparison of the first and second characteristics and a corrected determined weight available for transfer, the corrected determined weight being calculated before each such adjustment of at least one of the first actuator and the second actuator for weight redistribution by reconciling information from at least a discrete sensor and a singulation sensor or a tank camera, wherein the reconciliation is performed using an error constant or a learning module.

2. The system of claim 1, wherein the at least one sensor is configured to measure the shape of a collection of product in the product storage system;

wherein the at least one sensor is one of a LIDAR sensor, ultrasonic sensor, or stereo camera sensor; and wherein the controller determines the volume of product in the product storage system based on the measured shape of the collection of product in the product storage system.

3. The system of claim 1, further comprising:

a user interface operatively coupled to the controller and configured to send a signal to the controller indicative of a quantity of seeds in the one or more tanks of the product storage system; and wherein the at least one sensor includes a first sensor configured to measure the singulation rate of seeds output from the product storage system; and wherein the controller determines the volume of product in the product storage system based on the determined quantity of seeds in the product storage system and the measured singulation rate received by the controller from the first sensor.

4. The system of claim 3, wherein the user interface is configured to send a signal to the controller indicative of the quantity of fertilizer in the one or more tanks of the product storage system;

wherein the at least one sensor further includes a second sensor configured to measure a flow rate of fertilizer output from the product storage system; and wherein the controller determines the volume of product in the product storage system based on the indicated quantity of fertilizer in the product storage system and the measured flow rate of fertilizer received by the controller from the second sensor.

5. The system of claim 1, further comprising a learning module operatively coupled to the controller and the at least one sensor;

wherein the at least one sensor is configured to capture images of a collection of product in the one or more tanks of the product storage system; and wherein the learning module includes instructions that when executed: (i) compare the captured images to prior images of collections of product in product storage tanks, and (ii) identify a volume of the collection of product in the one or more tanks of the product storage system based on stored relationships between the prior images and corresponding volumes of product;

wherein the controller determines the volume of product in the product storage system based on the identified volume received from the learning module.

6. The system of claim 1, wherein the at least one sensor includes:

a first sensor positioned at a first height in the product storage system and a second sensor positioned at a second height in the product storage system below the first sensor;

wherein the first sensor is configured to detect whether a collection of product in the product storage system is positioned level with or above a first sensor and the second sensor is configured to detect whether the collection of product in the product storage system is positioned level with or above the second sensor; and wherein the controller determines the volume of product in the product storage system in response to receiving an indication from the second sensor that the collection of product is no longer equal to or above the second sensor.

7. A system for automatically redistributing weight across a frame of an agricultural machine during operation thereof, the system comprising:

the frame including: a center section, a first wing section coupled to the center section, and a second wing section coupled to the center section and positioned opposite the first wing section;

a product storage system supported by the center section and including one or more tanks configured to store product usable in an operation of the agricultural machine;

a first actuator coupled to the center section and to the first wing section;

a second actuator coupled to the center section and to the second wing section; and at least one sensor configured to measure or detect a characteristic associated with the product stored in the product storage system;

a first wheel assembly sensor configured to measure or detect a first characteristic associated with a first downward force applied at a first wheel assembly coupled to the first wing section;

a second wheel assembly sensor configured to measure or detect a second characteristic associated with a second downward force applied at a second wheel assembly coupled to the second wing section;

a controller operatively coupled to the first actuator, the second actuator, and the at least one sensor, wherein the controller is configured to adjust at least one of the first actuator and the second actuator to redistribute weight across the frame based on a comparison of the first and second characteristics and the determined weight available for transfer;

a first sensor positioned at a first height in the product storage system and a second sensor positioned at a second height in the product storage system below the first sensor, wherein the first sensor is configured to detect whether a collection of product in the product storage system is positioned level with or above a first sensor and the second sensor is configured to detect whether the collection of product in the product storage system is positioned level with or above the second sensor;

a third sensor configured to measure at least one of a singulation rate of seed and a flow rate of fertilizer output from the one or more tanks of the product storage system;

wherein the controller is configured to:

determine the volume of product in the product storage system based on at least one measured or detected characteristic associated with the product and received from the at least one sensor;

determine, using the volume of product, a weight of the product in the product storage system available for transfer;

determine the volume of product in the product storage system in response to receiving an indication from the second sensor that the collection of product is no longer equal to or above the second sensor;

determine a volume of product remaining in the one or more tanks of the product storage using a signal from the third sensor;

determine, upon receipt of a signal from the first sensor or the second sensor, (1) a volume of product remaining in the one or more tanks of the product storage system using the signal from the first sensor or the second sensor, and (2) replace the volume determined using the signal from the third signal with the volume determined using the signal from the first sensor or the second sensor; and determine, upon receipt of an updated signal from the third sensor, (1) a volume of product remaining in the one or more tanks of the product storage system using the updated signal, and (2) replace the volume determined using the signal from the first sensor or the second sensor with the volume determined using the updated signal.

8. The system of claim 1, wherein the at least one sensor is configured to measure the vibration frequency of the one or more tanks of the product storage system;

wherein the controller determines the volume of product in the product storage system based on the measured vibration frequency of the one or tanks of the product storage system.

9. The system of claim 1, further comprising at least one additional sensor operatively coupled to the controller and configured to measure or detect a characteristic associated with a row unit coupled to the frame of the agricultural machine; and wherein the controller is configured to adjust at least one of the first actuator and the second actuator based on the measured or detected characteristic associated with the row unit coupled to the frame of the agricultural machine.

10. The system of claim 1, wherein the first wheel assembly comprises a tire, a third actuator having a cylinder configured to adjust a downward force of the tire on the soil, and the first wheel assembly sensor;

wherein the first characteristic comprises at least one of a pressure within the cylinder and a pressure within the tire; and wherein the controller is configured to adjust the first actuator based on the first characteristic received from the first wheel assembly sensor.

11. A system for automatically redistributing weight across a frame of an agricultural machine during operation thereof, the system comprising:

the frame including: a center section, a first wing section coupled to the center section, and a second wing section coupled to the center section and positioned opposite the first wing section;

a product storage system supported by the center section and including one or more tanks configured to store product usable in an operation of the agricultural machine;

a first actuator coupled to the center section and to the first wing section;

a second actuator coupled to the center section and to the second wing section; and at least one sensor configured to measure or detect a characteristic associated with the product stored in the product storage system;

a first wheel assembly sensor configured to measure or detect a first characteristic associated with a first downward force applied at a first wheel assembly coupled to the first wing section, wherein the first wheel assembly comprises a first tire, and wherein the first wheel assembly sensor is configured to capture a first set of images of the soil prior to compaction by the first tire and a second set of images subsequent to compaction by the first tire;

a second wheel assembly sensor configured to measure or detect a second characteristic associated with a second downward force applied at a second wheel assembly coupled to the second wing section;

a third wheel assembly and a third wheel assembly sensor, the third wheel assembly coupled to the center frame and comprising a second tire, wherein the third wheel assembly sensor is configured to capture a third set of images of the soil prior to compaction by the second tire and a fourth set of images subsequent to compaction by the second tire;

a controller operatively coupled to the first actuator, the second actuator, and the at least one sensor;

wherein the controller is configured to determine the volume of product in the product storage system based on at least one measured or detected characteristic associated with the product and received from the at least one sensor;

wherein the controller is configured to determine, using the volume of product, a weight of the product in the product storage system available for transfer;

wherein the controller is configured to adjust at least one of the first actuator and the second actuator to redistribute weight across the frame based on a comparison of the first and second characteristics and the determined weight available for transfer;

wherein the controller is configured to determine a first change in compaction based on a comparison between the first set of images and the second set of images, and determine a second change in compaction based on a comparison between the third set of images and the fourth set of images; and wherein the controller is configured to adjust the first actuator based on a comparison between the first change in compaction and the second change in compaction.

12. The system of claim 9, wherein the at least one additional sensor includes: (i) a first sensor configured to measure a pressure applied by a cylinder of the row unit, and (ii) a second sensor configured to measure a downforce of the row unit;

wherein the controller is configured to compare: (i) the measured pressure applied by the row unit with (ii) a predetermined maximum pressure of the cylinder of the row unit;

wherein the controller is configured to compare the measured downforce of the row unit to a desired downforce at the row unit; and wherein, if the controller determines that: (i) the measured downforce is less than the desired downforce and (ii) the measured pressure is at least equal to the maximum pressure, then the controller is configured to adjust at least one of the first actuator and the second actuator based on the measured pressure applied by the row unit and the measured downforce at the row unit, each of which are received by the controller from the at least one additional sensor.

13. A method of automatically redistributing weight across a frame of an agricultural machine during operation thereof, the method comprising:

determining a volume of product in a product storage system of the agricultural machine, wherein the product storage system is supported by the frame;

determining a type of product in the product storage system based on input received from a user interface;

determining a weight of the product in the product storage system based on the determined type and determined volume of product in the product storage system;

determining a first characteristic associated with a first downward force applied at a first wheel assembly coupled to a first wing section positioned adjacent to a center section of the frame;

determining a second characteristic associated with a second downward force applied at a second wheel assembly coupled to a second wing section of the frame positioned adjacent to the center section and opposite the first wing section;

determining a corrected determined weight available for transfer, the corrected determined weight being calculated by reconciling information from at least a discrete sensor and a singulation sensor or a tank camera, wherein the reconciliation is performed using an error constant or a learning module;

adjusting, to redistribute weight across the frame, a first actuator coupled to the center section and to the first wing section, wherein such adjustment of the first actuator includes distributing weight based on a comparison of the first and second characteristics and the corrected determined weight, the corrected determined weight being determined before each such adjustment of the first actuator;

adjusting, to redistribute weight across the frame, a second actuator coupled to the center section and to the second wing section, wherein such adjustment of adjusting the second actuator includes distributing weight based on a comparison of the first and second characteristics and the corrected determined weight, the corrected determined weight being determined before each such adjustment of the second actuator; and repeating the determining and adjusting steps throughout operation of the agricultural machine.

14. The method of claim 13, wherein determining the volume of product in the product storage system includes:

measuring a shape of a collection of product in the product storage system via at least one of a LIDAR sensor, an ultrasonic sensor, or a stereo camera sensor.

15. The method of claim 13, wherein determining the volume of product in the product storage system includes:

determining an initial quantity of product in the product storage system via a user interface; and at least one of:

measuring a singulation rate of seeds output from the product storage system; and measuring a flow rate of fertilizer output from the product storage system.

16. The method of claim 13, wherein determining the volume of product in the product storage system includes:

capturing images of a collection of product in one or more tanks of the product storage tanks; and comparing the captured images of product in the one or more tanks to prior images of collections of product, wherein the prior images are each associated a volume of product.

17. The method of claim 13, wherein determining the volume of product in the product storage system includes:

determining whether a collection of product in the product storage system is positioned at a height that is level with or above a first sensor positioned at a first height in the product storage system; and determining whether the collection of product in the product storage system is positioned at a height that is level with or above a second sensor positioned at a second height in the product storage system, wherein the second sensor is positioned below the first sensor.

18. The method of claim 17, wherein determining the volume of product in the product storage system further includes:

measuring with a third sensor at least one of:

a singulation rate of seeds output from the product storage system; and a flow rate of fertilizer from output from the product storage system.

19. The method of claim 18, wherein determining the volume of product in the product storage system further includes:

comparing the volume as determined from the second sensor with the volume as determined from the third sensor;

identifying an error constant based on the difference between the volume as determined from the second sensor and the volume as determined from the third sensor; and updating the determined volume of product in the product storage system based on the error constant.

20. A method of automatically redistributing weight across a frame of an agricultural machine during operation thereof, the method comprising:

determining the weight of a measured volume of product within a product storage system supported by the frame, wherein determining the weight of the measured volume of product includes measuring or detecting, with a first set of one or more sensors, a characteristic associated with the product in the product storage system;

measuring, with a second set of one or more sensors, a first operational characteristic of the agricultural machine, wherein the first operational characteristic is associated with one or more row units or one or more wheel assemblies coupled to the frame of the agricultural machine;

measuring, with a third set of one or more sensors, a second operational characteristic of the agricultural machine, wherein the second operational characteristic is also associated with one or more row units or one or more wheel assemblies coupled to the frame of the agricultural machine;

comparing the first measured operational characteristic with the second measured operational characteristic; and adjusting an actuator coupled to a center section of the frame and to a wing section of the frame to redistribute the weight of the measured volume of product based on a corrected determined weight of the product within the product storage system and the comparison between the first measured operational characteristic and the second measured operational characteristic, the corrected determined weight being calculated before each adjustment of the actuator for redistribution of the weight by reconciling information from at least a discrete sensor and a singulation sensor or a tank camera, wherein the reconciliation is performed using an error constant or a learning module.

* * * * *